Patented Mar. 25, 1941

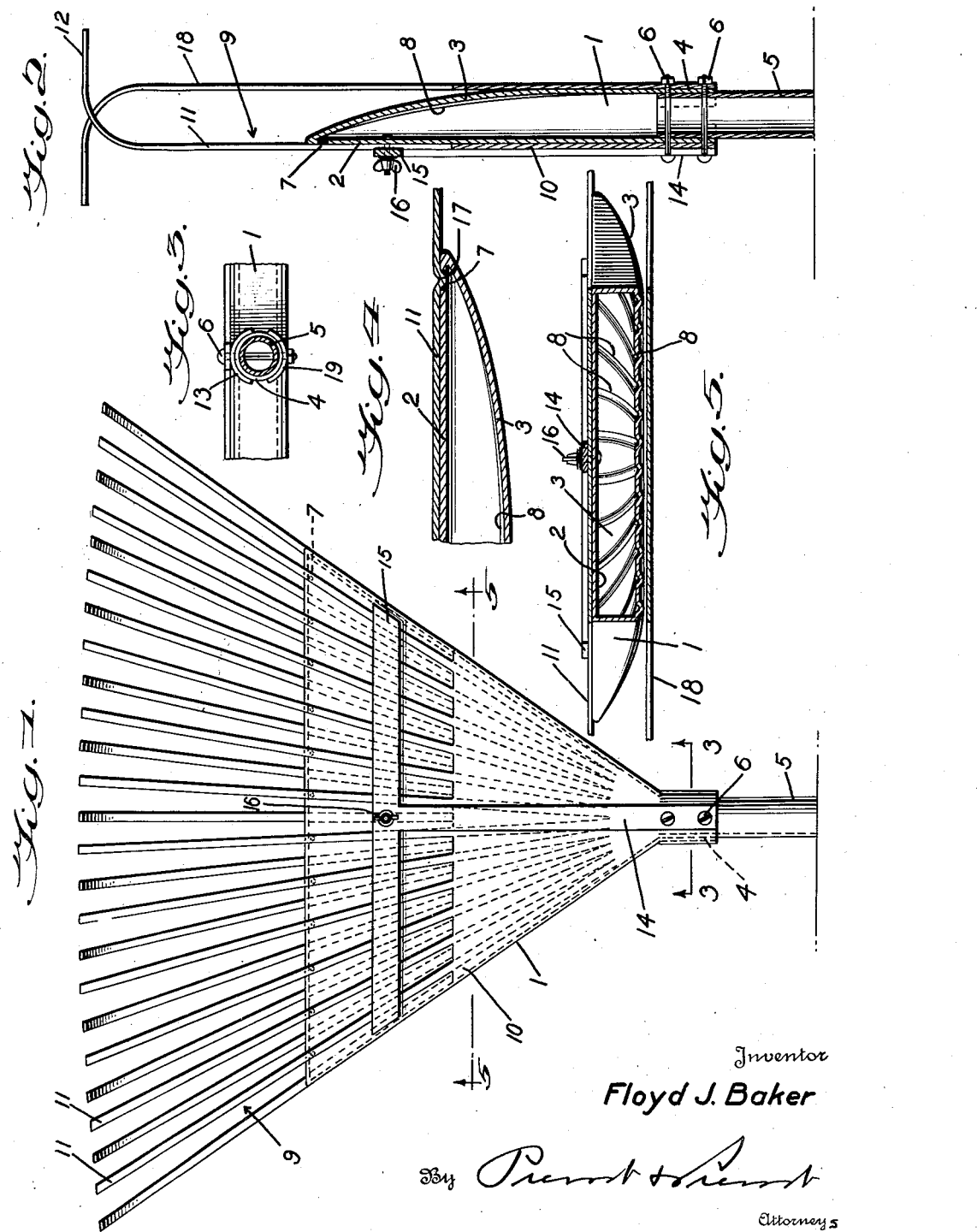

2,236,129

UNITED STATES PATENT OFFICE 2,236,129

DISPENSING RAKE

Floyd J. Baker, Bethesda, Md., assignor of one-third to G. Mallet Prevost, Washington, D. C.

Application August 10, 1939, Serial No. 289,482

6 Claims. (Cl. 111—1)

My invention consists in new and useful improvements in a seeding or dispensing rake and has for its object to provide an implement having a seed magazine so arranged with respect to the teeth of the rake that in one operation seeds may be evenly and thoroughly distributed over a lawn and raked in.

Another object and advantage of my invention lies in the arrangement of the teeth of the rake with respect to a series of ports in the magazine whereby the discharge of seeds through a series of ports is controlled by the flexing movement of the teeth during the raking operation.

A still further object of my invention is to provide means for regulating and adjusting the volume of seeds discharged from the magazine ports.

Finally, it is my object to provide a seeding rake which is simple and efficient in construction and one which can be manufactured and sold at a reasonable cost.

With the above and other objects in view which will appear as the description proceeds, my invention consists in the novel features herein set forth, illustrated in the accompanying drawing and more particularly pointed out in the appended claims.

Referring to the drawing in which numerals of like character designate similar parts throughout the several views, Fig. 1 is a top plan view of my improved seeding rake, Fig. 2 is a longitudinal sectional view taken through the central portion of the rake, Fig. 3 is a fragmentary section taken on line 3—3 of Fig. 1, Fig. 4 is an enlarged sectional view showing the cooperation of a modified rake tooth with the corresponding magazine port, and Fig. 5 is a sectional view taken on line 5—5 of Fig. 1.

In the drawing I represents the magazine or hopper which is preferably triangular in shape as shown in Fig. 1 having a flat top 2 and a gradually curved bottom 3, the forward edge of which joins the forward edge of the top 2 as shown in Figs. 2 and 4.

The rear or converging end of the magazine is provided with a socket or the like 4 by means of which a handle 5 is secured in place with bolts and nuts 6. Preferably the handle 5 is hollow and serves as the means for filling the magazine I with seeds, a suitable closure or cap being applied to the end of the rake handle (not shown). It will be understood, of course, that I may employ a solid handle and fill the magazine in any convenient manner.

At the forward edge of the top 2 of the magazine I provide a series of transversely spaced ports 7 and the bottom 3 is preferably provided with a series of radiating grooves or channels 8 which extend from the rear end of the magazine and terminate adjacent respective ports 7, whereby the distribution and feeding of seeds to the ports is facilitated.

Adjacent the top 2 of the magazine I provide the rake proper 9 which, in the form shown in the drawing, consists of a flat triangular body portion 10 preferably of resilient sheet metal and having a series of radiating teeth 11 projecting from its forward edge, the outer extremities of said teeth being preferably bent downwardly as at 12 in Fig. 2. If desired this rake proper may be stamped out of a single piece of sheet metal, the rear end of the body portion 10 being curved as at 13 to fit around the socket 4 on the magazine, the bolts and nuts 6 securing the same in place. It will be understood that I do not intend to limit myself to this particular construction of rake proper as I may, if desired, employ individual teeth and secure the same to the magazine top or the handle in any convenient manner.

The teeth 11 are so arranged with respect to the top 2 of the magazine that each tooth lies normally in direct contact with the top and overlies normally one of the ports 7 thereby closing the same, as shown in Fig. 2. As before stated, the rake teeth are preferably resilient and when their curved ends 12 are drawn across the ground the teeth are flexed upwardly to open the respective ports 7, thereby permitting seeds to be discharged through the ports.

In order to regulate the degree of opening of the ports 7, either for the purpose of controlling the volume of seeds discharged or for accommodating different types and sizes of seeds, I preferably employ a T-shaped member 14 which is secured to the handle 5 by the bolts 6, the cross head 15 of said T-shaped member spanning the upper faces of the rake teeth 11. A thumb screw arrangement 16 regulates the pressure of the cross head 15 on the rake teeth and thus controls the extent of movement away from the ports 7.

In the modified form shown in Fig. 4, I have provided a projecting button 17 on the underface of each rake tooth adjacent to the respective port 7, said buttons serving as valves to engage and close the ports.

In order to render my improved rake more efficient and to prevent the accumulation of rakings on the teeth 11, I may employ a second set of oppositely disposed rake or cleaning teeth 18 secured to the lower side of the magazine 1 and interposed between the main rake teeth 11. This second set of teeth may be formed similar to the teeth 11 and stamped out of a single piece of sheet metal if desired, a curved socket engaging member 19 securing the cleaning teeth to the magazine.

Thus, during the raking operation with the teeth 11 the flexing of the rake teeth will cause a constant movement with respect to the supplemental rake, teeth 18 thereby effecting a self-cleaning of the rake.

Furthermore with this arrangement if it is desired to simply use the instrument as a rake and not as a seeder the rake may be reversed and the rake teeth 18 used instead of the seeding teeth 11.

It will be apparent that this improved seeding rake may be used with great efficiency in seeding lawns, spreading fertilizer, and for various other purposes wherein it is desired to distribute materials over extended areas.

From the foregoing it is believed that my invention may be readily understood by those skilled in the art without further description, it being borne in mind that numerous changes may be made in the details disclosed without departing from the spirit of the invention as set forth in the following claims. For example, although I have shown the rake teeth arranged substantially in a fan shape, it is to be understood that I do not intend to confine myself to this specific arrangement. The same is true with respect to the shape of the seed magazine which may be varied as desired.

What I claim and desire to secure by Letters Patent is:

1. A dispensing rake comprising a magazine having a series of discharge ports, a plurality of resilient rake teeth associated with said magazine and overlying respective ports to normally close the same, a handle and means securing the latter to said magazine and teeth, whereby the application of normal raking pressure to said resilient teeth will flex the same and open said ports.

2. A dispensing rake comprising a magazine hopper having along one transverse edge, a series of discharge ports, a corresponding series of resilient rake teeth associated with said hopper and overlying respective ports to normally close the same, a handle and means securing the latter to said hopper and teeth, whereby the application of normal raking pressure to said resilient teeth will flex the same and open said ports.

3. A device as claimed in claim 1 including means for adjusting the extent of movement of said resilient teeth away from said ports.

4. A device as claimed in claim 1 including a projection on each of said rake teeth for engaging respective ports to close the same.

5. A dispensing rake comprising a handle, a series of rake teeth carried by said handle, a hopper underlying said rake teeth and having a series of discharge ports in its upper face disposed beneath respective rake teeth, said rake teeth being tensioned to normally close said ports, whereby the application of a normal raking pressure to said teeth will open said ports.

6. A dispensing rake comprising a magazine hopper having a series of discharge ports, valve means for said ports, a series of rake teeth associated with said valve means to normally maintain the latter in closed position, a handle, and means securing the latter to said hopper and teeth, whereby the application of normal raking pressure to said rake teeth will cause the opening of said valve means.

FLOYD J. BAKER.